C. F. ECKART.
MULSH.
APPLICATION FILED SEPT. 23, 1919.
1,372,995.
Patented Mar. 29, 1921.
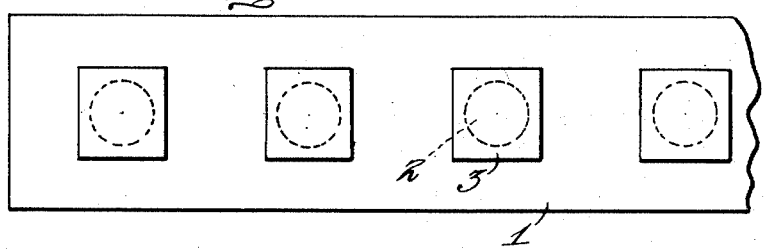
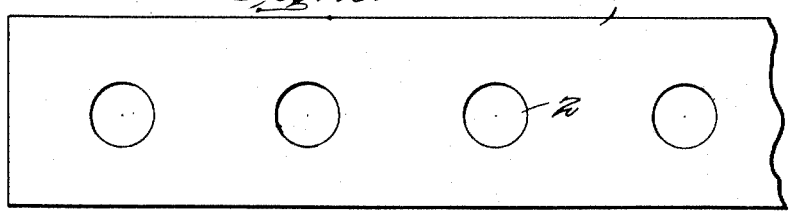
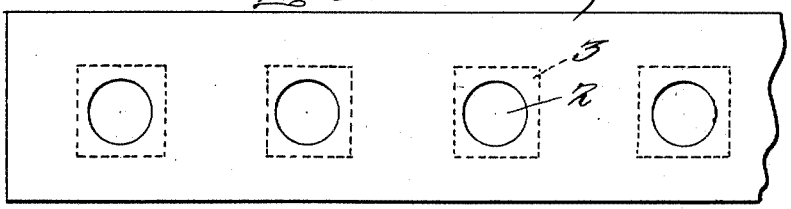
INVENTOR.
Chas. F. Eckart.
BY
Chas. J. O'Niell.
ATTORNEY.

UNITED STATES PATENT OFFICE.

CHARLES FRANKLIN ECKART, OF OLAA, TERRITORY OF HAWAII.

MULSH.

1,372,995.　　　　Specification of Letters Patent.　　Patented Mar. 29, 1921.

Application filed September 23, 1919. Serial No. 325,722.

*To all whom it may concern:*

Be it known that I, CHARLES F. ECKART, a citizen of the United States, residing at Olaa, in the county of Hawaii, Territory of Hawaii, have invented certain new and useful Improvements in Mulshes; and I do hereby declare the following to be a full, clear, and exact description of the invention, such as will enable others skilled in the art to which it appertains to make and use the same.

I have proposed to enhance the growth of plants by a method which consists broadly in the moistening of the soil of the proposed rows, the superimposing of a dark-colored, opaque and substantially waterproof covering over the lines of the proposed rows until the weed seeds and bulbs have been germinated and the resulting weeds exterminated, and which consists finally in the exposing of planting areas through said coverings or mulshes and the planting of the plant seeds or other stock in said areas, after which the coverings or mulshes are permitted to remain in place during the growth of the plants.

The present invention relates to a mulsh, by means of which the above general method may be carried out.

In the drawing:

Figure 1 is a diagrammatic view of a portion of the mulsh, showing the condition of the same immediately after it has been placed upon the proposed line of the row and during the germination of the seeds and the extermination of the resulting weeds;

Fig. 2 illustrates the mulsh after the planting centers have been exposed; and

Fig. 3 is a view illustrating a modification of the assembly of the covers in relation to the body of the mulsh.

The mulsh in its preferred form consists of a strip of dark-colored, opaque, waterproof paper or fabric 1, which paper or fabric is preferably impregnated, coated or otherwise treated with tar, asphalt, creosote, oil, wax, paraffin, paint, or a mixture of two or more of these substances. The strip of material is provided with a plurality of spaced openings 2, which in the drawing are illustrated as circular in form but which obviously, may be of any contour desired. These openings are adapted to be covered by patch-like covers 3, which are, in the form illustrated in Fig. 1, superimposed upon the strip and, in the form illustrated in Fig. 3, inserted beneath the strip. The covers 3 are merely placed upon the strips to close the openings 3 therein and are held in place in any suitable manner, the essential requirement being that they be susceptible of removal when it is desired to plant through the strip. It will likewise be realized that the particular shape of the covers, which covers in the drawing are illustrated as rectangular, is not essential, as they may be of various shapes.

In using the covering or mulsh, such as illustrated in Fig. 1, the mulsh which is prepared at the factory with the openings 2, is unrolled along the lines of the proposed rows of plants after the soil along the proposed rows has been properly moistened either artificially or by rain and after the fertilizer, if fertilizer be used, has been applied and the soil placed in the proper tilth. After the mulsh has been put in place it is permitted to remain for sufficient time to insure the germination of the weed seeds and bulbs, etc., and the smothering and consequent extermination of the resulting weeds. This germination of the weed seeds and bulbs and the extermination of the weeds is greatly enhanced by the water in the soil and by the solar heat which is radiated into the soil from the mulsh due to the material of which the mulsh is formed. The extermination is also enhanced because of the fact that the mulsh is placed in surface contact with the ground. After the weeds are exterminated the covers 3 are removed so as to expose the planting areas through the openings 2. These covers may be stacked and suitably stored for future use. The plant seeds or other stock are then planted in the planting areas which are exposed by the openings 2 and the mulsh 1 permitted to remain in place. This remaining portion of the mulsh will, of course, enhance the growth of the plants, inasmuch as it retains the moisture in the soil and insures a relatively constant soil temperature, that is to say, a temperature which is not subject to the daily fluctuations which ordinarily occur.

When the form illustrated in Fig. 3 is used the covers 3, instead of being superimposed on the mulsh as shown in Fig. 1, are inserted beneath the same so that the mulsh itself will retain the covers in place. After the weeds have been exterminated, when this form of the mulsh is used, the covers may be withdrawn from the edges of the mulsh.

It will be realized that the mulsh may be entirely prepared at the factory so that it is only necessary for the operator or workman to lay the same along the row and to cover the openings 2 by the covers 3 by superimposing the latter on the strip 1 or by inserting the same beneath the strip. The openings 2 being systematically arranged will likewise insure the proper setting of the plants. Furthermore, the making of the mulsh waterproof, insures the shedding of a great quantity of the water during the heavy rains and also prevents the evaporation of the soil moisture to a great extent so that the roots of the plants can accommodate themselves in certain zones which contain the proper amount of moisture. The strips 1 and the covers 2 may be maintained in place in any suitable manner, by the use of stones, earth or pegs, for instance. Furthermore, the openings 2 may be arranged in the strip 1 in any suitable manner and there may be one or more rows as desired.

What I claim is:

1. A mulsh consisting of a strip of material having openings formed therein and covers for said openings.

2. A mulsh consisting of a strip of material having systematically arranged openings formed therein and covers for said openings.

3. A mulsh consisting of a strip of material having openings formed therein and removable covers for said openings.

4. A mulsh consisting of a strip of material having openings therein spaced predetermined distances apart and removable covers for said openings.

5. A mulsh comprising a strip of waterproof fabric, having spaced openings therein, and removable covers for said openings.

6. A mulsh comprising a strip of waterproof fabric, having spaced openings therein, and removable coverings for the several openings of larger area than the said openings.

In testimony whereof I affix my signature.

CHARLES FRANKLIN ECKART.